(12) United States Patent
Shirooka et al.

(10) Patent No.: US 11,479,103 B2
(45) Date of Patent: Oct. 25, 2022

(54) BATTERY PACK FOR VEHICLE

(71) Applicant: TOYOTA JIDOSHA KABUSHIKI KAISHA, Aichi-ken (JP)

(72) Inventors: Masakazu Shirooka, Toyota (JP); Yuna Yagi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 381 days.

(21) Appl. No.: 16/776,523

(22) Filed: Jan. 30, 2020

(65) Prior Publication Data
US 2020/0262284 A1  Aug. 20, 2020

(30) Foreign Application Priority Data
Feb. 20, 2019  (JP) .............................. JP2019-028132

(51) Int. Cl.
*B60K 1/00* (2006.01)
*B60K 1/04* (2019.01)
*B62D 25/20* (2006.01)

(52) U.S. Cl.
CPC ........ *B60K 1/04* (2013.01); *B60K 2001/0438* (2013.01); *B62D 25/20* (2013.01)

(58) Field of Classification Search
CPC ... B60K 1/04; B60K 2001/0438; B62D 25/20
See application file for complete search history.

(56) References Cited

U.S. PATENT DOCUMENTS

| | | | | |
|---|---|---|---|---|
| 5,214,824 A | * | 6/1993 | Lesser | B60J 1/005 16/225 |
| 5,558,949 A | * | 9/1996 | Iwatsuki | H01M 10/658 180/68.5 |
| 5,886,501 A | * | 3/1999 | Marks | H01M 50/20 320/112 |
| 7,931,105 B2 | * | 4/2011 | Sato | B60L 50/64 180/2.2 |
| 8,276,697 B2 | * | 10/2012 | Takasaki | B60L 3/0007 903/952 |
| 8,936,125 B2 | * | 1/2015 | Nakamori | H01M 50/20 220/651 |
| 2010/0289295 A1 | * | 11/2010 | Yoda | B60K 1/04 296/187.03 |
| 2011/0309795 A1 | * | 12/2011 | Firehammer | H01M 10/4207 320/118 |
| 2013/0241493 A1 | * | 9/2013 | Kosaki | H01M 10/613 320/128 |

(Continued)

FOREIGN PATENT DOCUMENTS

| | | |
|---|---|---|
| JP | 2008184015 A | 8/2008 |
| JP | 2018-16243 A | 2/2018 |
| JP | 201883524 A | 5/2018 |

*Primary Examiner* — Hau V Phan
(74) *Attorney, Agent, or Firm* — Hauptman Ham, LLP

(57) ABSTRACT

A battery pack houses battery stacks vertically in a plurality of stages. The battery pack includes a lower casing, a holder formed of leg portions attached to the lower casing in front and back of the battery stacks in the lower stage and a frame attached on upper portions of the leg portions, and a plate member that connects the lower casing and the frame of the holder. The battery stacks in an upper stage are arranged on top of the frame along the length of the vehicle.

4 Claims, 5 Drawing Sheets

(56) References Cited

U.S. PATENT DOCUMENTS

| | | | |
|---|---|---|---|
| 2013/0273398 A1* | 10/2013 | Hoshi | B60K 1/04 |
| | | | 429/61 |
| 2014/0045025 A1* | 2/2014 | Fritz | H01M 50/20 |
| | | | 429/99 |
| 2017/0001586 A1* | 1/2017 | Ashraf | B60R 19/34 |
| 2018/0029493 A1* | 2/2018 | Kobayashi | H01M 50/20 |
| 2018/0236863 A1* | 8/2018 | Kawabe | B60K 1/04 |
| 2018/0337374 A1* | 11/2018 | Matecki | B60K 1/04 |

* cited by examiner

BATTERY PACK FOR VEHICLE

CROSS REFERENCE TO RELATED APPLICATION

This application claims priority to Japanese Patent Application No. 2019-028132 filed on Feb. 20, 2019, which is incorporated herein by reference in its entirety including the specification, claims, drawings, and abstract.

TECHNICAL FIELD

The present disclosure relates to a structure of a battery pack mounted in a vehicle.

BACKGROUND

The structure of a battery pack for a vehicle, including a plurality of battery stacks each having a rectangular parallelepiped shape arranged on a base plate along the width or the length of a vehicle has been proposed. These battery stacks are secured to the base plate with coupling plates, to prevent falling of the battery stacks at the time of a crash of the vehicle (see JP 2018-16243 A, for example).

SUMMARY

In recent years, a vehicle structure has been considered in which a battery pack including two-stage battery stacks is mounted under the vehicle floor to extend the cruising range of electric vehicles. In this structure, the battery stacks in the upper stage may be disposed on a holder having leg portions placed between the battery stacks in the lower stage. In a frontal crash of the vehicle, inertial force of the battery stacks in the upper stage in this structure can move the holder forward to urge the leg portions of the holder into contact with the battery stacks in the lower stage.

An embodiment of the disclosure is therefore directed at inhibiting contact between battery stacks in a lower stage and a holder that supports battery stacks in an upper stage in the event of a vehicle frontal crash, in a battery pack housing the battery stacks vertically.

In accordance with an aspect of the disclosure, a battery pack for a vehicle, housing a plurality of battery stacks vertically in a plurality of stages, includes a lower casing on which the battery stacks in a lower stage are arranged along a length of the vehicle, a holder including leg portions attached to the lower casing in front and back of the battery stacks in the lower stage and a frame attached on upper portions of the leg portions, and a reinforcement disposed outward of the battery stacks in the lower stage in a vehicle width direction to connect the lower casing and the frame of the holder. The battery stacks in an upper stage are arranged on top of the frame along the length of the vehicle.

The lower casing and the frame on the upper part of the holder are connected by the reinforcement, and, in a vehicle frontal crash, load directed forward of the vehicle, which is applied by inertial force of the battery stacks in the upper stage, is received by the reinforcement. This structure reduces the amount of forward tilting deformation of the leg portions, to thereby inhibit contact of the leg portions with the battery stacks in the lower stage.

The battery pack for a vehicle of the disclosure may further include a protrusion disposed on a front portion of the frame of the holder, protruding forward of the vehicle, and an upper casing attached on top of the lower casing to face the protrusion and cover a front portion of the protrusion.

When the holder moves forward in a frontal crash, the protrusion abuts against the upper casing to regulate the forward movement of the holder. This further inhibits contact between the leg portions of the holder and the battery stacks in the lower stage.

In the battery pack for a vehicle of the disclosure, the protrusion may be a bracket for fastening wiring.

This structure reduces contact between the leg portions of the holder and the battery stacks in the lower stage without the need for an additional member that inhibits displacement of the holder in a vehicle frontal crash.

In the battery pack for a vehicle of the disclosure, the battery pack may be mounted under a floor panel of the vehicle such that a forward portion of the upper casing facing the protrusion of the holder is located at the back of a floor cross member extending along a width of the vehicle.

This structure allows the forward portion of the upper casing against which the protrusion hits in a vehicle frontal crash to abut with the floor cross member which is a frame member in the front portion of the vehicle. Thus, the amount of forward movement of the holder in a vehicle frontal crash can be reduced to thereby effectively regulate contact between the leg portions of the holder and the battery stacks in the lower stage.

The battery pack for a vehicle housing battery stacks vertically according to the disclosure inhibits contact between battery stacks in the lower stage with a holder holding battery stacks in the upper stage in a vehicle frontal crash.

BRIEF DESCRIPTION OF DRAWINGS

Embodiment(s) of the present disclosure will be described based on the following figures, wherein.

DESCRIPTION OF EMBODIMENTS

A battery pack 100 according to an embodiment will be described below with reference to the drawings. In each drawing, an arrow FR, an arrow UP, and an arrow RH indicate the forward direction (traveling direction), the upward direction, and the rightward direction of a vehicle 50, respectively. Directions opposite to these arrows FR, UP, and RH indicate the rearward direction, the downward direction, and the leftward direction of the vehicle, respectively. In the following description, unless otherwise specified, forward and rearward, leftward and rightward, and upward and downward refer to forward and rearward along the length of a vehicle, leftward and rightward along the width of the vehicle, and upward and downward along the height of the vehicle, respectively.

Figure 1:
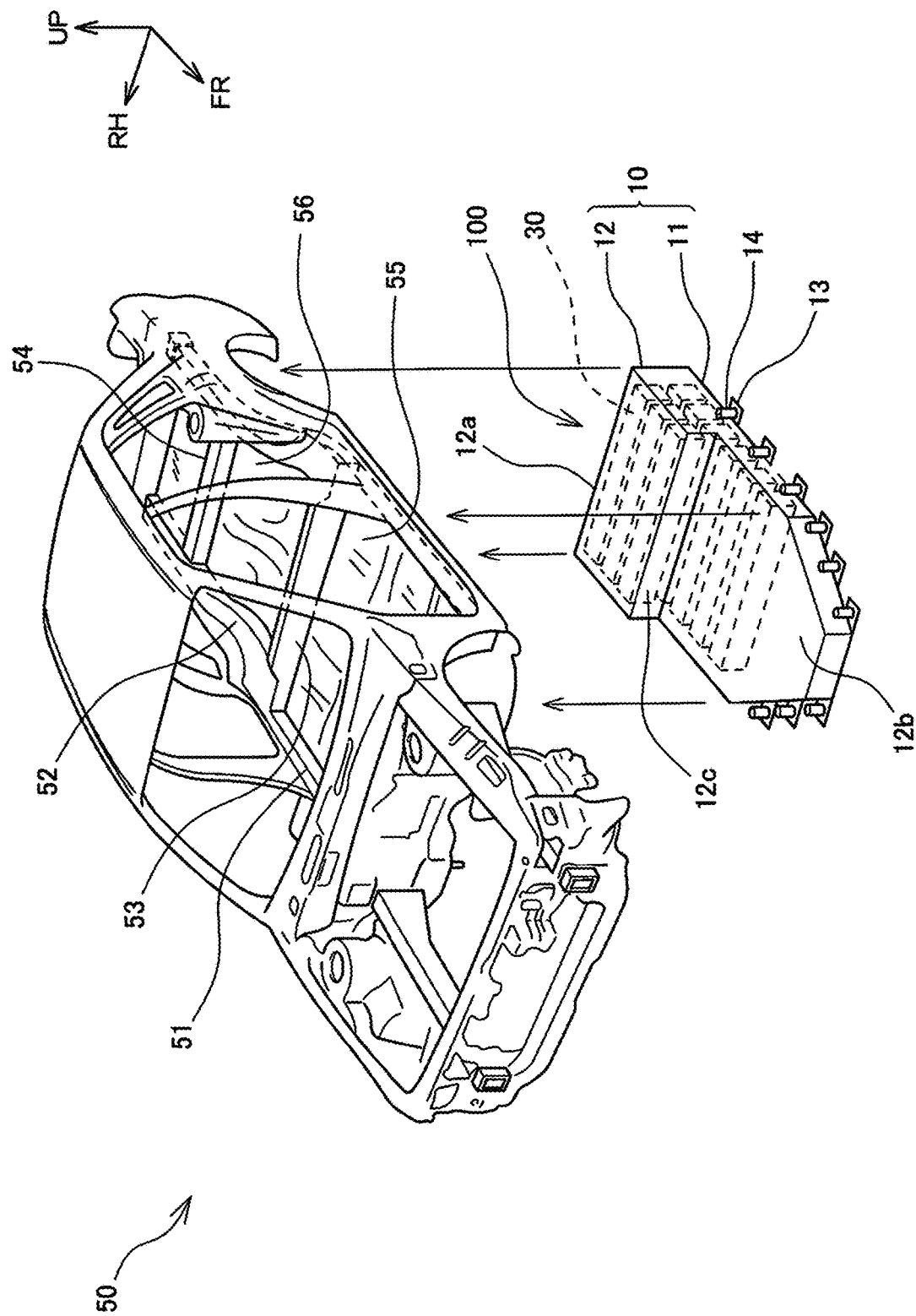
FIG. 1 is a perspective view illustrating a vehicle body in which a battery pack according to an embodiment is mounted.

As illustrated in FIG. 1, the battery pack 100 for a vehicle includes a plurality of battery stacks 30 housed in a casing 10 formed by a lower casing 11 and an upper casing 12. The battery stack 30 has a rectangular parallelepiped shape formed of a plurality of battery cells stacked longitudinally. The battery stacks 30 are housed in the battery pack 100 such that the stacking direction corresponds to the vehicle width direction. The battery stacks 30 are housed vertically in two stages, an upper stage and a lower stage, in the rearward portion of the battery pack 100 and are housed in a single stage in the frontward portion of the battery pack 100.

The battery pack 100 is mounted under floor panels 55 and 56 of a vehicle 50. The body of the vehicle 50 includes rocker panels 51 which are frame members, rear side members 52, a floor cross member 53, and a rear cross member 54. The rocker panels 51 are longitudinal members disposed on opposite left and right sides in the lower part of the vehicle and extending along the length of the vehicle. The rear side members 52 are longitudinal members connected to the respective rocker panels 51 and extending rearward of the vehicle on opposite left and right sides of the vehicle. The floor cross member 53 connects the left and right rear side members 52 in the front portions of the rear side members 52. The rear cross member 54 connects the left and right rear side members 52 in the rear portions of the rear side members 52. The floor panels 55 and 56 forming a floor surface of the vehicle 50 are disposed between the left and right rocker panels 51 and between the left and right rear side members 52, respectively. The floor panel 55 at the front is disposed under the floor cross member 53, and the floor panel 56 at the rear has a rear portion raised to a height close to the top of the floor cross member 53.

The lower casing 11 of the battery pack 100 includes cross frames 13 extending along the width of the vehicle and having ends protruding outward in the vehicle width direction from the lower casing 11. The ends of the cross frames 13 protruding outward in the vehicle width direction, and the left and right rocker panels 51 and the left and right rear side members 52 of the vehicle 50 are connected via posts 14. As such, the battery pack 100 is suspended from the rocker panels 51 and the rear side members 52 and mounted under the floor panels 55 and 56.

Figure 2:
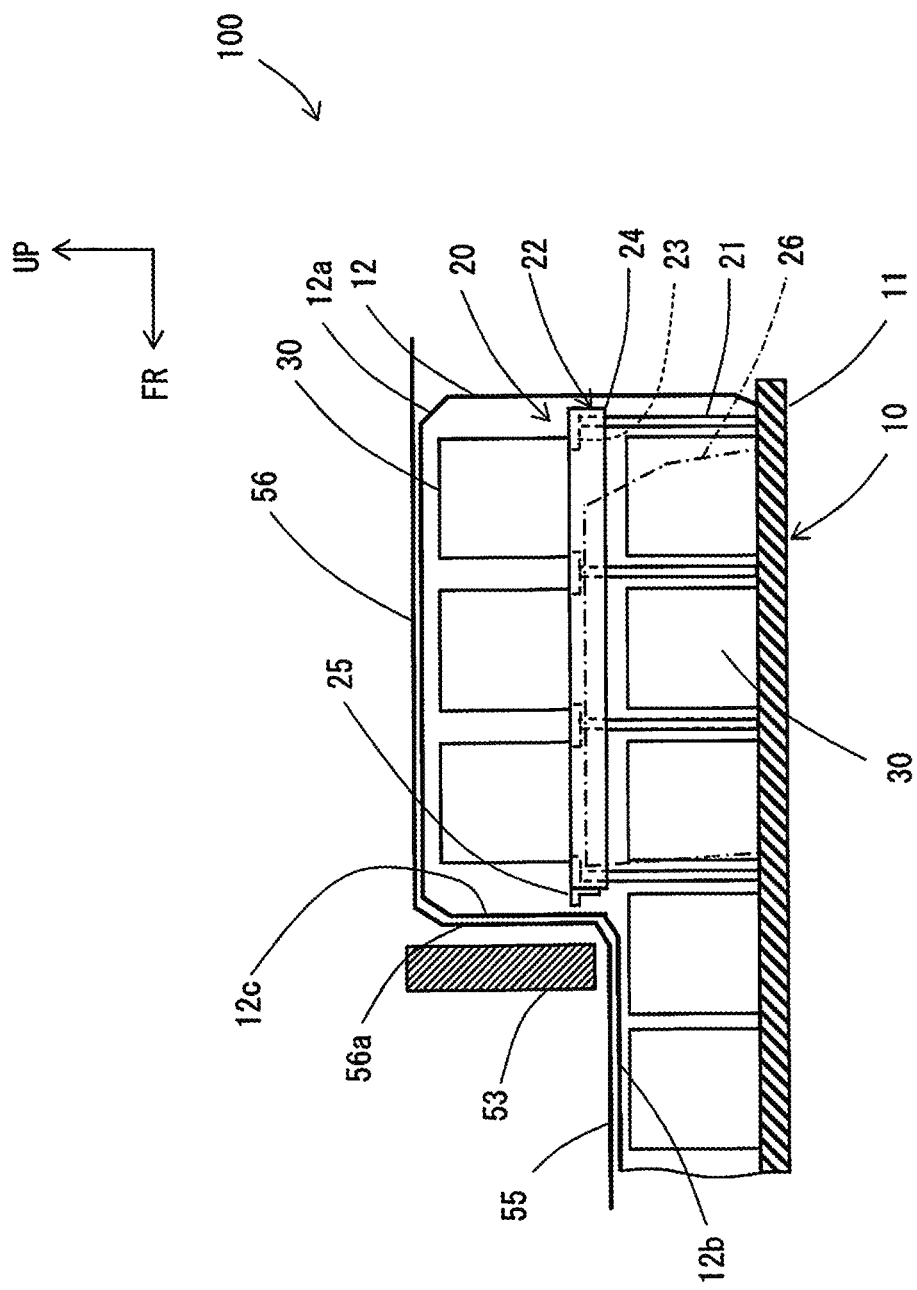
FIG. 2 is a cross sectional view of the battery pack according to the embodiment.

As illustrated in FIG. 2, among the battery stacks 30 housed vertically in two stages, the battery stacks 30 in the lower stage are arranged on the lower casing 11 along the length of the vehicle. A holder 20 on which the battery stacks 30 in the upper stage are mounted is disposed on the lower casing 11.

Figure 3:
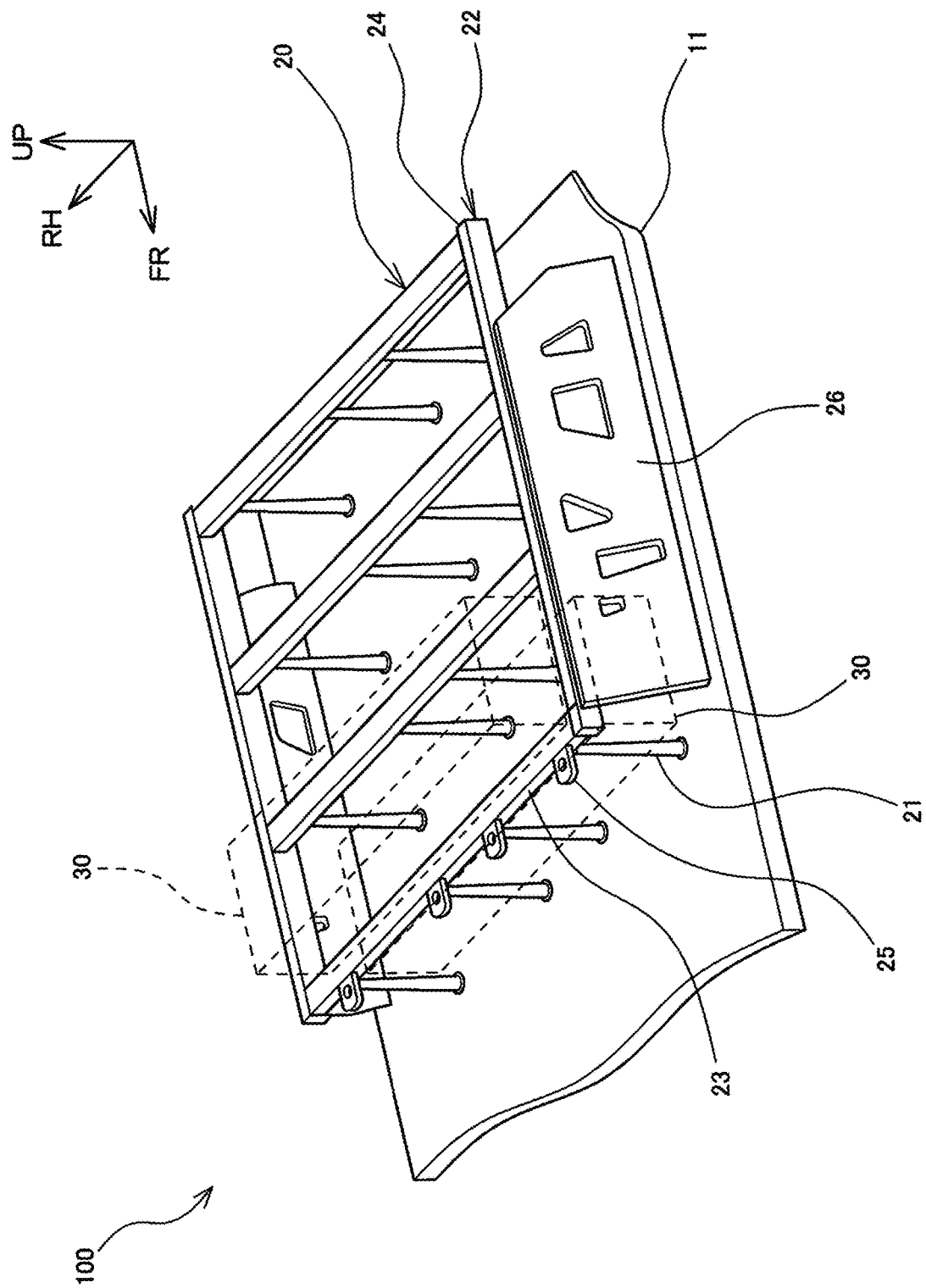
FIG. 3 is a perspective view illustrating a holder and a plate member of the battery pack according to the embodiment.

As illustrated in FIG. 3, the holder 20 includes a plurality of leg portions 21 fixed on the lower casing 11 and a frame 22 attached on top of the leg portions 21. The leg portions 21 are disposed in front of and at the back of each of the battery stacks 30 in the lower stage arranged along the vehicle length. The frame 22 includes a plurality of cross beams 23 connected with upper ends of the leg portions 21 and extending along the vehicle width, and side beams 24 longitudinally connecting ends of each cross beam 23 in the vehicle width direction. The cross beams 23 and the side beams 24 form a rectangular frame shape of the frame 22. The battery stacks 30 in the upper stage are arranged along the vehicle length above the frame 22.

A plate member 26, which is a reinforcement connecting the frame 22 and the lower casing 11, is attached to the outer surface of the side beam 24 of the frame 22 in the vehicle width direction. The plate member 26 is disposed further outward of the battery stacks 30 in the lower stage in the vehicle width direction. The front most cross beam 23 of the frame 22 of the holder 20 includes, on the frontward portion thereof, brackets 25 for fastening wiring, that form protrusions protruding forward of the vehicle.

As illustrated in FIG. 2, the upper casing 12 is a metallic cover attached on top of the lower casing 11 to externally cover the battery stacks 30, the holder 20, the plate member 26, and the brackets 25. The upper casing 12 includes a rear portion 12a covering the rear part of the battery pack 100 housing the battery stacks 30 in vertical two stages, and a front portion 12b covering the front part of the battery pack 100 housing the battery stacks 30 in a single stage. The rear portion 12a includes a forward portion 12c which faces and covers front portions of the brackets 25.

The rear part of the battery pack 100 which houses the battery stacks 30 vertically in two stages is mounted under the floor panel 56 raised to the height close to the top of the floor cross member 53 behind the floor cross member 53. The front part of the floor panel 56 forms a vertical wall portion 56a that is bent downward along the floor cross member 53. The front part of the battery pack 100 that houses the battery stacks 30 in a single stage is mounted under the floor panel 55 disposed below the floor cross member 53.

Therefore, when the battery pack 100 is mounted on the vehicle 50, the floor cross member 53, the vertical wall portion 56a of the floor panel 56, and the forward portion 12c of the rear portion 12a of the upper casing 12 are arranged in a line along the length of the vehicle. Further, the brackets 25 of the holder 20 are located behind the floor cross member 53.

Figure 4:
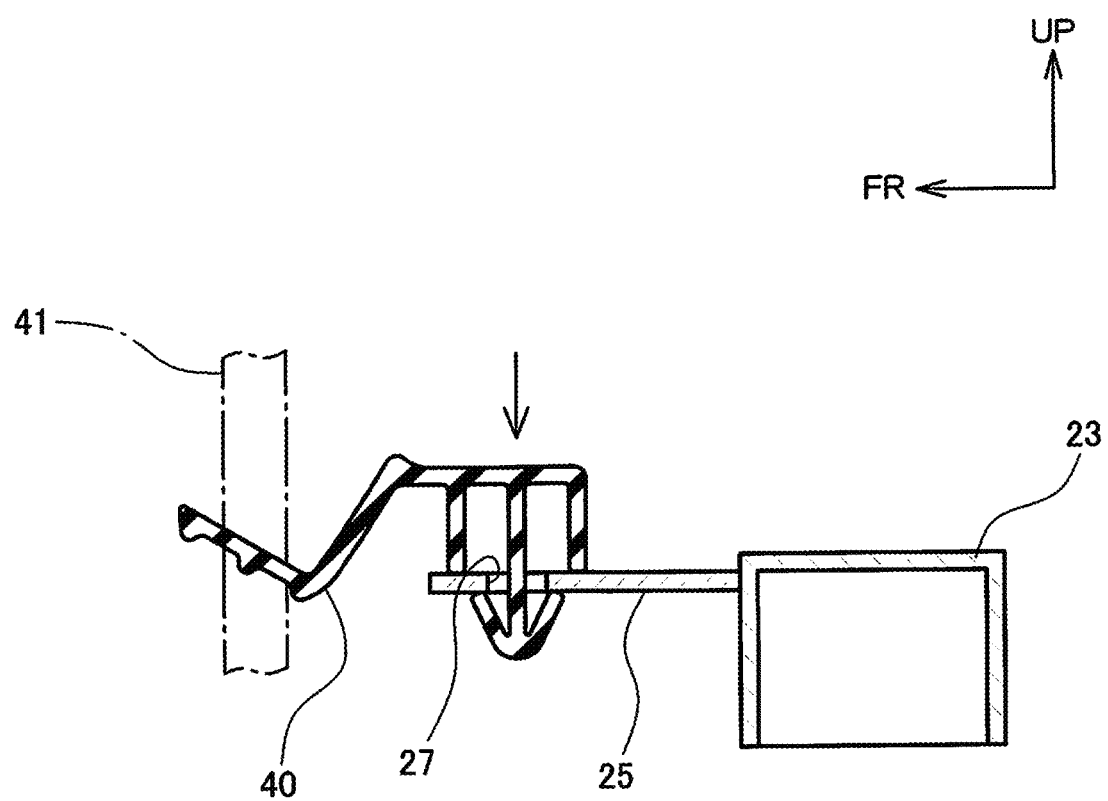
FIG. 4 is a cross sectional view of a bracket for fastening wiring disposed on the holder of the battery pack according to the embodiment.

As illustrated in FIG. 4, the bracket 25 is a metallic plate member having a hole 27 through which a tip end of a resin clip 40 attached to a wiring 41 is inserted.

Figure 5:
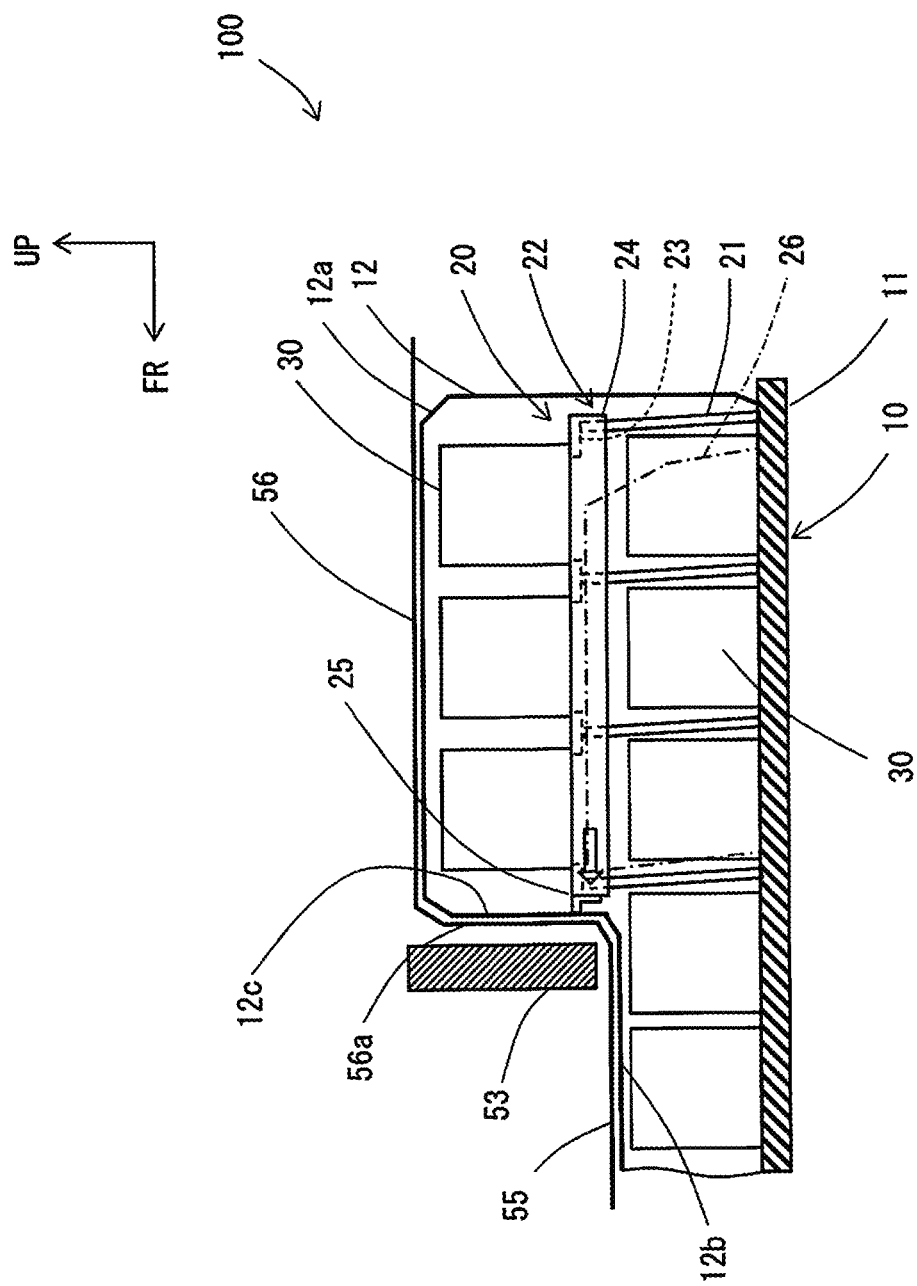
FIG. 5 is a cross sectional view illustrating deformation of the holder in a frontal crash of the vehicle.

Referring now to FIG. 5, deformation of each portion of the vehicle 50 including the battery pack 100 having the above-described configuration caused in a frontal crash will be described.

In a frontal crash of the vehicle 50, the inertial force of the battery stacks 30 in the upper stage causes forward load to be applied to the holder 20, as indicated by a blank arrow in FIG. 5. The forward load is transmitted to the lower casing 11 via the plate members 26 attached on right and left sides of the frame 22 of the holder 20. This decreases the amount of the forward movement of the frame 22 on the upper portion of the holder 20 relative to the lower casing 11.

When the holder 20 moves forward relative to the lower casing 11 at the beginning of the frontal crash, the tip ends of the brackets 25 attached to the front of the frame 22 of the holder 20 come into contact with the forward portion 12c of the rear portion 12a of the upper casing 12. The forward movement of the holder 20 is thus restricted by the forward portion 12c of the upper casing 12, which further reduces the forward movement of the holder 20 relative to the lower casing 11.

When the forward portion 12c of the upper casing 12 subsequently abuts against the vertical wall portion 56a of the floor panel 56 or against the floor cross member 53 which is a frame member via the vertical wall portion 56a in the frontal crash, these members restrict the forward movement of the forward portion 12c of the upper casing 12. As illustrated in FIG. 1, the lower casing 11 is attached, by the posts 14, to the rocker panels 51 and the rear side member 52 connected with the floor cross member 53. Thus, the movement of the lower casing 11 relative to the floor cross member 53 is small. This inhibits the forward movement of the frame 22 in the upper portion of the holder 20 of the battery pack 100 relative to the lower casing 11.

The amount of the forward movement of the frame 22 in the upper portion of the holder 20 relative to the lower casing 11 is thus reduced in a frontal crash, which decreases the tilting angle of the leg portions 21 toward the front of the vehicle. It is therefore possible to inhibit the leg portions 21 from abutting against the battery stacks 30 in the lower stage adjacent to the leg portions 21 in the vehicle forward direction in a frontal crash.

As described above, in a frontal crash of a vehicle, the battery pack 100 according to the present embodiment inhibits contact between the battery stacks 30 in the lower stage with the leg portions 21 of the holder 20 holding the battery stacks 30 in the upper stage.

While, in the above example, the battery stacks 30 are housed vertically in two stages in the rear portion of the battery pack 100, the battery stacks 30 may be housed in two or more stages. Further, while, in the above example, the battery stacks 30 have a rectangular parallelepiped shape, they may have other shapes including a cylindrical shape and a plate shape. Also, while, in the above example, the reinforcement is the plate member 26, the shape of the reinforcement is not limited to a plate shape, and may be a combination of a rod shape and a columnar shape.

The invention claimed is:

1. A battery pack for a vehicle, the battery pack housing a plurality of battery stacks vertically in a plurality of stages, the battery pack comprising:
   a lower casing on which the battery stacks in a lower stage are arranged along a length of the vehicle;
   a holder including leg portions attached to the lower casing in front and back of the battery stacks in the lower stage and a frame attached on upper portions of the leg portions, the battery stacks in an upper stage being arranged on top of the frame along the length of the vehicle;
   a reinforcement disposed outward of the battery stacks in the lower stage in a vehicle width direction to connect the lower casing and the frame of the holder;
   a protrusion disposed on a front portion of the frame of the holder, the protrusion protruding forward of the vehicle; and
   an upper casing attached on top of the lower casing to face the protrusion and cover a front portion of the protrusion.

2. The battery pack according to claim 1, wherein the protrusion is a bracket for fastening wiring.

3. The battery pack according to claim 2, wherein, the battery pack is mounted under a floor panel of the vehicle such that a forward portion of the upper casing facing the protrusion of the holder is located at the back of a floor cross member extending along a width of the vehicle.

4. The battery pack according to claim 1, wherein, the battery pack is mounted under a floor panel of the vehicle such that a forward portion of the upper casing facing the protrusion of the holder is located at the back of a floor cross member extending along a width of the vehicle.

* * * * *